United States Patent
Robert

(10) Patent No.: US 8,614,737 B2
(45) Date of Patent: Dec. 24, 2013

(54) SYSTEM AND METHOD FOR THREE-DIMENSIONAL VIDEO CAPTURE WORKFLOW FOR DYNAMIC RENDERING

(75) Inventor: Arnaud Robert, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 418 days.

(21) Appl. No.: 12/584,726

(22) Filed: Sep. 11, 2009

(65) Prior Publication Data

US 2011/0063410 A1  Mar. 17, 2011

(51) Int. Cl.
*H04N 13/00* (2006.01)

(52) U.S. Cl.
USPC .................................. 348/42; 348/25; 348/43

(58) Field of Classification Search
USPC .................................................. 348/25, 42, 43
See application file for complete search history.

(56) References Cited

U.S. PATENT DOCUMENTS

| | | | |
|---|---|---|---|
| 6,208,348 B1 | 3/2001 | Kaye | |
| 6,515,659 B1 | 2/2003 | Kaye | |
| 6,686,926 B1 | 2/2004 | Kaye | |
| 7,102,633 B2 | 9/2006 | Kaye | |
| 7,116,323 B2 | 10/2006 | Kaye | |
| 7,116,324 B2 | 10/2006 | Kaye | |
| 2007/0064816 A1* | 3/2007 | Chiang et al. | 375/240.29 |
| 2007/0139612 A1* | 6/2007 | Butler-Smith et al. | 351/201 |
| 2007/0146360 A1* | 6/2007 | Clatworthy et al. | 345/419 |
| 2007/0146372 A1* | 6/2007 | Gee et al. | 345/474 |
| 2008/0018784 A1* | 1/2008 | Bennett | 348/439.1 |
| 2008/0074424 A1* | 3/2008 | Carignano | 345/473 |
| 2008/0247635 A1* | 10/2008 | Davis et al. | 382/152 |
| 2009/0270054 A1 | 10/2009 | Ridgers et al. | |
| 2009/0317061 A1* | 12/2009 | Jung et al. | 386/95 |
| 2010/0042377 A1* | 2/2010 | Seroussi et al. | 703/1 |
| 2011/0086618 A1* | 4/2011 | DeGrazia et al. | 455/414.1 |

FOREIGN PATENT DOCUMENTS

| | | |
|---|---|---|
| EP | 1587329 | 10/2005 |
| EP | 1770607 | 4/2007 |
| JP | 2003-187261 | 7/2003 |
| JP | 4188968 | 12/2008 |
| KR | 10-0496513 | 10/2005 |
| WO | WO 2004/056133 | 7/2004 |
| WO | WO 2004/071102 | 8/2004 |
| WO | WO 2009034519 | 3/2009 |
| WO | WO 2009083863 | 7/2009 |

OTHER PUBLICATIONS

*3D Interface Specifications*, White Paper,< http://www.business-sites.philips.com/shared/assets/3dsolutions/downloads/3DInterfaceWhitePaper.pdf> ( Dated Apr. 8, 2009).

* cited by examiner

*Primary Examiner* — Djenane Bayard
(74) *Attorney, Agent, or Firm* — Farjami & Farjami LLP

(57) ABSTRACT

There is provided a system and method for a three-dimensional video capture workflow for dynamic rendering. There is provided a method of generating three-dimensional video data comprising obtaining two-dimensional video data from a scene having a plurality of objects, identifying objects in the scene, obtaining relative positions of the plurality of objects, encoding the two-dimensional video data to generate encoded two-dimensional video data, generating relative positions metadata based on the relative positions of the plurality of objects, and providing a three-dimensional depth factor metadata for operation on the relative positions metadata. In this manner, existing two-dimensional workflows may be utilized in a cost effective manner, and end users may adjust the three-dimensional depth factor metadata to suit particular rendering environments or personal viewing preferences.

22 Claims, 2 Drawing Sheets

SYSTEM AND METHOD FOR THREE-DIMENSIONAL VIDEO CAPTURE WORKFLOW FOR DYNAMIC RENDERING

BACKGROUND OF THE INVENTION

1. Field of the Invention

The present invention relates generally to video capture and presentation. More particularly, the present invention relates to video capture and presentation for three-dimensional video.

2. Background Art

Three-dimensional video presentation is experiencing a revival of interest from the movie industry, the video game industry, and general consumers. Increasingly, movie theaters and television broadcasters are offering three-dimensional presentations to provide enhanced immersion for consumers. At the same time, the industry has not yet settled on three-dimensional capture, processing and presentation standards, resulting in multiple, incompatible solutions that are each tailored to specific applications. Additionally, three-dimensional video materials are generally optimized and encoded with a specific targeted rendering environment, such as a movie theater, a presentation stage, or a television set. As a result, producing video materials for three-dimensional presentations often involves significant additional expenses and scheduling to accommodate three-dimensional post-production workflows for specific applications and for specific underlying solutions. Furthermore, customization of three-dimensional effects is limited and playback with existing systems is not possible. These combined factors are delaying retail release schedules and slowing down consumer adoption of three-dimensional video, consequently preventing consumers from adopting three-dimensional presentation technology at their own preferred pace and viewing preferences. Finally, in a digital world where consumers are increasingly in control of their own devices and their own experiences, there is no present three-dimensional solution that allows consumers to vary the three-dimensional effects to their liking.

Accordingly, there is a need to overcome the drawbacks and deficiencies in the art by providing a three-dimensional video capture workflow that avoids the restrictions inherent in tailoring to a specific end application.

SUMMARY OF THE INVENTION

There are provided systems and methods for a three-dimensional video capture workflow for dynamic rendering, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for a three-dimensional video capture workflow for dynamic rendering. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
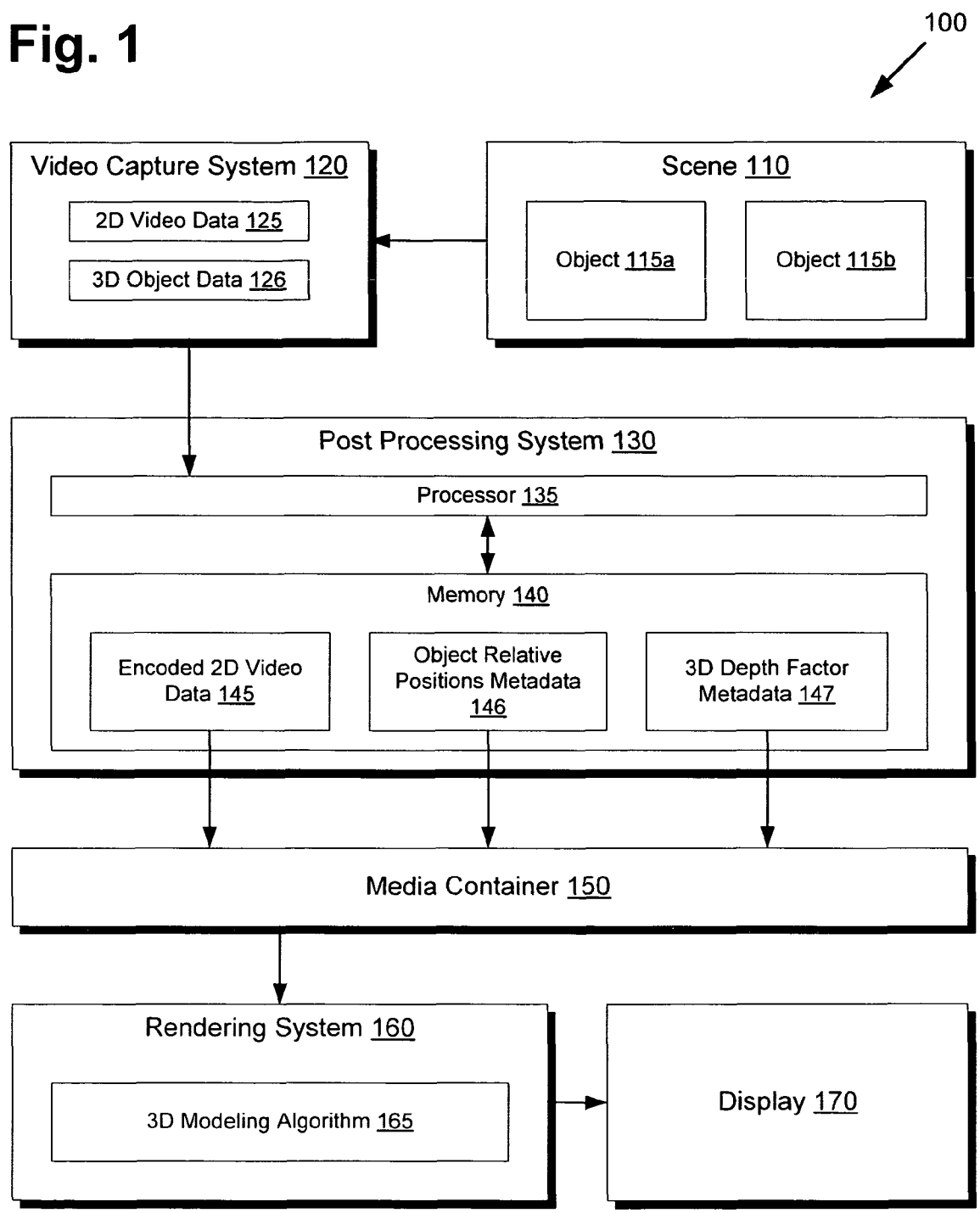
FIG. 1 presents a system for a three-dimensional video capture workflow for dynamic rendering, according to one embodiment of the present invention.

FIG. 1 presents a system for a three-dimensional video capture workflow for dynamic rendering, according to one embodiment of the present invention. Diagram 100 of FIG. 1 includes scene 110, video capture system 120, post processing system 130, media container 150, rendering system 160, and display 170. Scene 110 includes objects 115a and 115b. Video capture system 120 includes 2D video data 125 and 3D object data 126. Post processing system 130 includes processor 135 and memory 140. Memory 140 includes encoded 2D video data 145, object relative positions metadata 146, and 3D depth factor metadata 147. Rendering system 160 includes 3D modeling algorithm 165.

Scene 110 may comprise a real or virtual environment to be captured by video capture system 120, such as a filming set or a computer generated three-dimensional world. Scene 110 contains a plurality of objects, shown in FIG. 1 as objects 115a and 115b, which are identified by video capture system 120 for three-dimensional processing. For example, objects 115a and 115b may comprise real or virtual actors, characters, buildings, backgrounds, projectiles, scenery, and other things for possible manipulation with three-dimensional effects. Besides capturing 2D video data 125, video capture system 120 can also obtain the positions of objects 115a and 115b as 3D object data 126. For example, video capture system 120 might use multiple cameras with different views of scene 110 to capture additional 2D video data for determining 3D object data 126. Video capture system 120 might alternatively use location-tracking systems such as radio frequency identification (RFID) tags, manually entered values using tape measurements, or pane references in the scene, such as where a scene is setup to have objects displayed on several distinct and identifiable panes. If scene 110 is wholly computer generated, then 3D object data 126 can be retrieved directly from rendering data used to create scene 110. Regardless of the particular method used, whether manual or automated, video capture system 120 is thus able to identify objects 115a and 115b within scene 110 and generate 3D object data 126.

Post processing system 130 may then receive 2D video data 125 and 3D object data 126 from video capture system 120. As shown in FIG. 1, processor 135 of post processing system 130 may then generate, in memory 140, encoded 2D video data 145, object relative positions metadata 146, and 3D depth factor metadata 147. Encoded 2D video data 145 may be generated using 2D video data 125 by, for example, applying a video compression codec. The 2D video data 125 may also be post-processed before encoding, for example to remove video artifacts or make the video stream more suitable for encoding or for three-dimensional operations. Object relative positions metadata 146 can be derived from 3D object data 126, specifying relative positions for objects identified by 3D object data 126. The relative positions may be specified in relation to a reference point in scene 110, such as a Z displacement from a X-Y plane represented within 2D video data 125, or a geometric X-Y plane represented by display 170. The relative positions may also be in relation to a global reference point, such as a vector from a fixed coordinate, or even in relation to other objects within scene 110. Moreover, object relative positions metadata 146 does not necessarily need to correspond to the original captured real-world object positions, as object relative positions metadata 146 may also be adjusted as part of the editing and post-production process in order to achieve an artistic result or look that may be different than the scene as recorded. For example, the depth of particular objects may be modified or exaggerated to provide a more dramatic appearance.

Additionally, 3D depth factor metadata 147 may also be provided by processor 135, which allows the customization and scaling of three-dimensional effects to suit a particular target environment. For example, 3D depth factor metadata 147 may provide a scaling multiplier for each of the relative position values in object relative positions metadata 146 on a global or individual basis, allowing three-dimensional depth effects to be scaled as appropriate for particular rendering environments. For example, for a large public theater application, 3D depth factor metadata 147 might specify a global 2.0× scaling effect to provide a more dramatic three-dimensional effect, whereas for a home theater application 3D depth factor metadata 147 might specify a global 0.5× scaling effect to provide an effect more suitable for smaller home-theater rooms, and for a Blu-ray application 3D depth factor metadata 147 might specify a default global 1.0× scaling effect, allowing consumers, institutional users, and other Blu-ray users to adjust three-dimensional effects on a global or individual object basis, based on user preference. 3D depth factor metadata 147 might also specify a negative scaling effect, which may be desirable for certain specific applications. The 3D depth factor metadata 147 can also be used to change the relative position of a subset of objects from scene 110. As an illustrative example, if scene 110 depicted a car chase, a scaling factor of 2.0× may be applied for a particular car in the scene but a scaling factor of 1.0× may be maintained for other cars in the scene.

Once processor 135 generates the components shown in memory 140, processor 135 may then package the components as part of media container 150 for distribution. Media container 150 may comprise, for example, a package according to the MPEG-4 or MPEG-21 multimedia framework or another flexible packaging format allowing the embedding of metadata along with encoded 2D video data 145. As shown in FIG. 1, this metadata may include object relative positions metadata 146 and 3D depth factor metadata 147. There also may be multiple 3D depth factor metadata 147 "profiles" in the media container 150, by which different metadata values could be used depending on the nature of the downstream rendering system. Continuing on the example above, the 3D depth factor metadata 147 may contain multiple scaling factors for the car, one for each of contemplated downstream rendering devices. In this manner, a single media container 150 could be used in multiple distribution channels and yet still ensure that the 3D effect is optimally selected with respect to the rendering system in use when rendering.

Note that since all three-dimensional information is separated into metadata, media container 150 can be treated much the same as a standard 2D video container by simply ignoring the metadata. In this manner, media container 150 can be easily integrated into existing 2D workflows and infrastructures, in contrast with existing 3D workflows that, for example, generate left and right 2D images that require specialized and proprietary workflow processes and equipment. Media container 150 may then be distributed via various distribution channels, such as 3D equipped television broadcast stations, 3D equipped movie theaters, 3D enabled Blu-ray discs, and digital downloads. As discussed, since media container 150 is structured such that three-dimensional information is separate from the standard 2D video data, media container 150 may readily integrate into existing 2D distribution channels as well.

Once media container 150 arrives at rendering system 160, which may comprise, for example, a 3D equipped theater projection system, a 3D equipped broadcast station, or a 3D capable Blu-ray player, then media container 150 may be interpreted and rendered on display 170. For example, if rendering system 160 is only 2D capable, then encoded 2D video data 145 may be simply be directly decoded and output as usual to display 170 as a continuous stream of frames, identical for both the left and right eyes of the consumer. If rendering system 160 is 3D capable, then 3D depth factor metadata 147 may further be applied to a temporary working copy of objects relative position metadata 146 for scaling and/or other 3D effects, followed by actually rendering 3D objects as described by objects relative positions metadata 146 after encoded 2D video data 145 is decoded for display 170. To render the 3D objects described by objects relative positions metadata 146, several different 3D rendering techniques are available to provide the perception of depth on display 170. These 3D rendering techniques, or 3D modeling algorithm 165 in FIG. 1, are well known in the art and essentially involve generating and presenting two different images for the left and right eyes of the consumer. For example, by using a display 170 that supports a high refresh rate, such as 120 hertz, a stream of alternating left-right images can be shown in quick succession, and various blocking mechanisms such as shuttered glasses can be used to ensure that the proper left or right image is shown to the corresponding left or right eye of the consumer. Alternatively, display 170 may project the two left and right images concurrently to the same screen but with different polarities, such as a 3D projection system using two projectors and orthogonal or circular polarization filters, with corresponding polarized glasses to filter the polarized images to the proper left and right eyes for the consumer. These are only a few examples of 3D rendering techniques in use today, and other 3D rendering techniques may also be used as well.

3D modeling algorithm 165 may be thus be applied to encoded 2D video data 145, object relative positions metadata 146 and 3D depth factor metadata 147 to render three-dimensional video using the left-right image rendering techniques discussed above. 3D modeling algorithm 165 may also be applied to object relative positions metadata 146 and 3D depth factor metadata 147 to render one or more of the objects identified from scene 110. As previously mentioned, 3D depth factor metadata 147 might be adjusted by the end user according to viewing preferences, to strengthen or weaken the three-dimensional depth effect for particular objects or globally to all objects.

For example, if rendering system 160 comprises a Blu-ray player, then a setup and configuration menu provided on a Blu-ray disc containing media container 150 might allow the adjustment of 3D depth factor metadata 147 to suit different viewing arrangements and preferences. Some consumers, for example, may find the three-dimensional effect disorienting or vertigo inducing, and may elect to set 3D depth factor metadata 147 to zero, effectively converting a three-dimensional video effect to a standard two-dimensional video (note that in this case, video data 145 would be rendered). Other consumers may enjoy the three-dimensional effects, but wish to enhance or reduce the effect according to their particular room arrangements or visual preferences. In this case, a virtual "3D effect knob" might be provided that allows continuous adjustment of 3D depth factor metadata 147 from a negative to positive scale. For example, said "3D effect knob" might be controlled by a consumer by using an input device connected to rendering system 160, such as a remote control, a computer mouse, or another device to manipulate a configuration screen on display 170 provided by rendering system 160, such as a Blu-ray player configuration screen, or media container 150, such as a DVD or Blu-ray disc format configuration menu providing user adjustable 3D depth factors.

During playback of media container 150, 3D modeling algorithm 165 is thus applied in real-time to media container 150 to render the three-dimensional portions of the video that are represented within metadata, or object relative positions metadata 146 and 3D depth factor metadata 147. With the steady increases in processor speed and correspondingly lower costs, a real-time 3D modeling algorithm might be readily supported by using unused computing cycles available to rendering system 160, by using specialized three-dimensional rendering acceleration hardware, or by integrating the three-dimensional functions within existing two-dimensional video decoding hardware. In this manner, three-dimensional presentation elements, including depth scaling of particular objects, corresponding object shadows, elements associated with horizontal or vertical parallax, and other elements can be automatically and dynamically generated on the fly for display 170. As such, 3D depth factor metadata 147 may be adjusted in a cost effective and flexible manner to apply for various environmental applications and user preferences, as opposed to requiring a separate 3D workflow for each specific desired application as in previous solutions.

Figure 2:
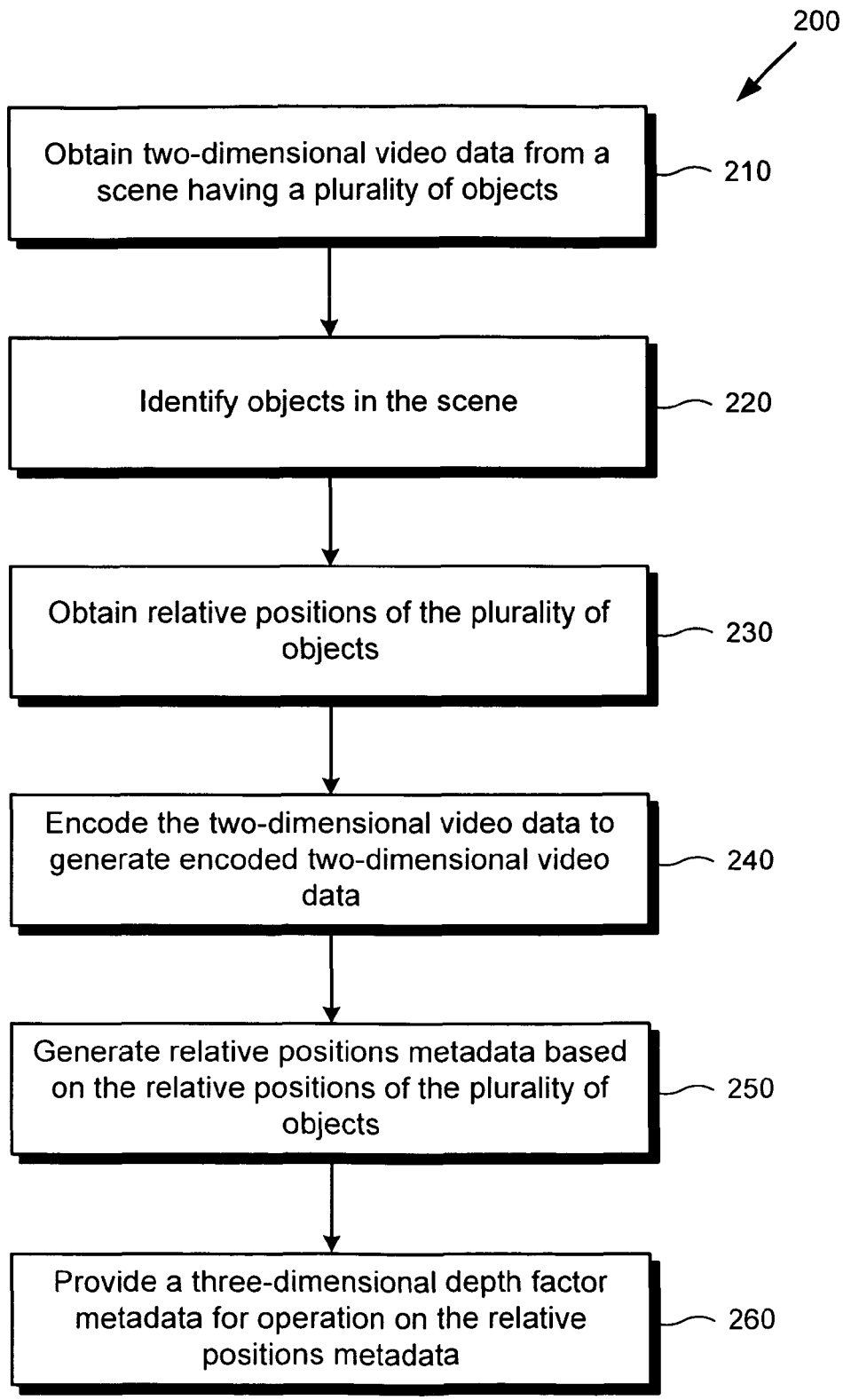
FIG. 2 shows a flowchart describing the steps, according to one embodiment of the present invention, by which three-dimensional video data may be generated for dynamic rendering.

FIG. 2 shows a flowchart describing the steps, according to one embodiment of the present invention, by which three-dimensional video data may be generated for dynamic rendering. Certain details and features have been left out of flowchart 200 that are apparent to a person of ordinary skill in the art. For example, a step may comprise one or more sub-steps or may involve specialized equipment or materials, as known in the art. While steps 210 through 260 indicated in flowchart 200 are sufficient to describe one embodiment of the present invention, other embodiments of the invention may utilize steps different from those shown in flowchart 200.

Referring to step 210 of flowchart 200 in FIG. 2 and diagram 100 of FIG. 1, step 210 of flowchart 200 comprises processor 135 obtaining 2D video data 125 from scene 110 having objects 115a and 115b. For example, video capture system 120 may include a conventional camera capable of capturing 2D video data 125 from scene 110. Processor 135 of post processing system 130 may then retrieve 2D video data 125 using a direct data connection or by an intermediary data transfer network (omitted in FIG. 1).

Referring to step 220 of flowchart 200 in FIG. 2 and diagram 100 of FIG. 1, step 220 of flowchart 200 comprises processor 135 identifying objects 115a and 115b in scene 110. As previously discussed, to accomplish step 220, video capture system 120 may use, for example, multiple cameras with varying viewpoints, location-tracking systems, manual data entry, pane references, or automatic computer generated object identification. The result of step 220 may be stored as 3D object data 126.

Referring to step 230 of flowchart 200 in FIG. 2 and diagram 100 of FIG. 1, step 230 of flowchart 200 comprises processor 135 obtaining 3D object data 126. Step 230 may be accomplished using a similar process as step 210 by using a direct data connection or a network.

Referring to step 240 of flowchart 200 in FIG. 2 and diagram 100 of FIG. 1, step 240 of flowchart 200 comprises processor 135 encoding 2D video data 125 to generate encoded 2D video data 145. As previously discussed, prior to step 240, post-processing may be applied to 2D video data 125 to enhance suitability for encoding or 3D processing. Step 240 may comprise, for example, applying a compression codec to reduce the data size of 2D video data 125.

Referring to step 250 of flowchart 200 in FIG. 2 and diagram 100 of FIG. 1, step 250 of flowchart 200 comprises processor 135 generating object relative positions metadata 146 based on the relative positions of 3D object data 126. As previously discussed, object relative positions metadata 146 may be derived from 3D object data 126 relative to several reference points, such as a 2D plane represented by 2D video data 125 or display 170.

Referring to step 260 of flowchart 200 in FIG. 2 and diagram 100 of FIG. 1, step 260 of flowchart 200 comprises processor 135 providing 3D depth factor metadata 147 for operation on object relative positions metadata 146. As previously discussed, 3D depth factor metadata 147 may be used to specify particular three-dimensional depth scaling factors for various rendering environments, such as public theaters, television broadcast, Blu-ray discs, or home theater. Furthermore, user specified 3D depth factors may also be used to suit particular environments or user preferences. As shown in FIG. 1, since the 3D components are separate from the 2D video components, media container 150 may be used in existing 2D post-processing workflows and infrastructure. Only the very end of the distribution chain, or rendering system 160, is required to interpret media container 150 using 3D modeling algorithm 165 in real-time to render three-dimensional video on display 170. All other intermediary workflow processes may simply ignore the extra 3D metadata from media container 150 and handle encoded 2D video data 145 as conventional 2D video content. In this manner, three-dimensional video content can be produced in a cost effective and flexible manner, and the consumer is empowered to adopt 3D presentation to match their own pace and preferences by simply adjusting 3D depth factor metadata 147.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of generating three-dimensional video data, the method comprising:
   obtaining two-dimensional video data from a scene having a plurality of objects;

identifying objects in the scene;
obtaining relative positions of the plurality of objects;
encoding the two-dimensional video data to generate encoded two-dimensional video data;
generating relative positions metadata based on the relative positions of the plurality of objects; and
providing a three-dimensional depth factor metadata for operation on the relative positions metadata, the three-dimensional depth factor metadata including an adjustable scaling effect based on a rendering environment selectable from a plurality of rendering environments.

2. The method of claim 1, wherein prior to the obtaining relative positions of the plurality of objects, the method further comprises: obtaining additional two-dimensional video data corresponding to different views of the scene.

3. The method of claim 1, wherein prior to the encoding of the two-dimensional video data, the method further comprises: post-processing the two-dimensional video data to generate post-processed two-dimensional video data, and wherein the encoding uses the post-processed two-dimensional video data to generate the encoded two-dimensional video data.

4. The method of claim 1, wherein the identifying uses one of radio frequency identification (RFID) tags, manual tape measurements, identifiable pane references in the scene, or automatically generated values from a computer rendering.

5. The method of claim 1 further comprising:
applying a three-dimensional modeling algorithm to the encoded two-dimensional video data, the relative positions metadata and the three-dimensional depth factor metadata to render the three-dimensional video data.

6. The method of claim 5, wherein the applying the three-dimensional modeling algorithm calculates left images and right images for the rendering of the three-dimensional video data.

7. The method of claim 1 further comprising applying a three-dimensional modeling algorithm to the relative positions metadata and the three-dimensional depth factor for rendering one or more of the plurality of objects.

8. The method of claim 1, wherein three-dimensional depth factor metadata varies the relative positions of one or more of the identified plurality of objects with respect to a reference point.

9. The method of claim 8, wherein three-dimensional depth factor metadata is within a negative-to-positive range with respect to the reference point.

10. The method of claim 9, wherein the reference point is a geometric plane of a rendering display.

11. The method of claim 1, wherein the relative positions metadata use a reference point contained in the scene.

12. The method of claim 1, wherein the relative position metadata use a reference point corresponding to a geometric plane of a rendering display.

13. The method of claim 1, wherein the relative position metadata use a global reference point.

14. The method of claim 1, wherein the relative position metadata use a plurality of reference points, each of the plurality of reference points corresponding to one or more of the plurality of objects.

15. The method of claim 1, wherein the adjustable scaling effect of the three-dimensional depth factor metadata is further based on a preference of user of the rendering environment.

16. The method of claim 15, wherein the plurality of rendering environments include a home theater rendering environment and a public theater rendering environment.

17. The method of claim 1, wherein the rendering environment is selectable by a user from the plurality of the rendering environments, and wherein the plurality of the rendering environments include a public theater rendering environment and a home theater rendering environment.

18. The method of claim 1, wherein the plurality of rendering environments include a Blu-ray rendering system.

19. A system for generating three-dimensional video data, the system comprising:
a processor configured to:
obtain two-dimensional video data from a scene having a plurality of objects;
identify objects in the scene;
obtain relative positions of the plurality of objects;
encode the two-dimensional video data to generate encoded two-dimensional video data;
generate relative positions metadata based on the relative positions of the plurality of objects; and
provide a three-dimensional depth factor metadata for operation on the relative positions metadata, the three-dimensional depth factor metadata including an adjustable scaling effect based on a rendering environment selectable from a plurality of rendering environments.

20. The system of claim 19, wherein the adjustable scaling effect of the three-dimensional depth factor metadata is further based on a preference of user of the rendering environment.

21. The system of claim 20, wherein the plurality of rendering environments include a home theater rendering environment and a public theater rendering environment.

22. The system of claim 19, wherein the rendering environment is selectable by a user from the plurality of the rendering environments, and wherein the plurality of the rendering environments include a public theater rendering environment and a home theater rendering environment.

* * * * *